(12) United States Patent
Benkreira et al.

(10) Patent No.: US 11,836,707 B2
(45) Date of Patent: *Dec. 5, 2023

(54) RELAXED FRAUD DETECTION FOR TRANSACTIONS USING VIRTUAL TRANSACTION CARDS

(71) Applicant: Capital One Services, LLC, McLean, VA (US)

(72) Inventors: Abdelkadar M'Hamed Benkreira, Washington, DC (US); Joshua Edwards, Philadelphia, PA (US); Adam Vukich, Springfield, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/659,540

(22) Filed: Apr. 18, 2022

(65) Prior Publication Data

US 2022/0237589 A1 Jul. 28, 2022

Related U.S. Application Data

(63) Continuation of application No. 16/555,426, filed on Aug. 29, 2019, now Pat. No. 11,315,106, which is a
(Continued)

(51) Int. Cl.
*G06Q 20/34* (2012.01)
*G06Q 20/40* (2012.01)
*G06F 16/955* (2019.01)

(52) U.S. Cl.
CPC ......... *G06Q 20/351* (2013.01); *G06F 16/955* (2019.01); *G06Q 20/354* (2013.01); *G06Q 20/409* (2013.01)

(58) Field of Classification Search
CPC .............................. G06Q 40/00; G06Q 20/00
(Continued)

(56) References Cited

U.S. PATENT DOCUMENTS 5,884,289 A * 3/1999 Anderson ............ G06Q 20/105
705/41
6,026,166 A * 2/2000 LeBourgeois ....... G06Q 20/023
705/76

(Continued)

OTHER PUBLICATIONS

Extended European Search Report for the Application No. EP19202931.2, dated Feb. 19, 2020, 10 pages.

*Primary Examiner* — Kirsten S Apple
(74) *Attorney, Agent, or Firm* — Harrity & Harrity, LLP

(57) ABSTRACT

A device may receive an authorization request, associated with a transaction made by a user device as part of a checkout procedure of a website, that includes a virtual transaction card identifier of a virtual transaction card that is being used for the transaction, and a first merchant identifier for a merchant associated with the website. The device may perform a first authorization procedure to determine whether the first merchant identifier, included in the authorization request, satisfies a threshold level of similarity with a second merchant identifier associated with a request to generate the virtual transaction card that occurred prior to receiving the authorization request. The device may determine whether to forego a second authorization procedure based on a result of the first authorization procedure, and cause an authorization response, that includes an indication of whether the transaction is approved, to be provided to another device associated with the merchant.

20 Claims, 9 Drawing Sheets

Related U.S. Application Data continuation of application No. 16/159,223, filed on Oct. 12, 2018, now Pat. No. 10,402,817.

(58) Field of Classification Search
USPC .................................................. 705/38, 35
See application file for complete search history.

(56) References Cited

U.S. PATENT DOCUMENTS

| | | | | |
|---|---|---|---|---|
| 6,466,921 B1 * | 10/2002 | Cordery | ........... | G07B 17/00733 705/401 |
| 6,554,183 B1 * | 4/2003 | Sticha | ................ | G06Q 10/0875 705/29 |
| 6,954,758 B1 * | 10/2005 | O'Flaherty | ............ | G06Q 30/02 707/999.102 |
| 7,165,037 B2 * | 1/2007 | Lazarus | ............. | G06Q 30/0269 705/7.31 |
| 7,319,990 B1 * | 1/2008 | Henty | ................ | G01G 19/4144 356/326 |
| 8,104,678 B2 * | 1/2012 | Yoshikawa | ........ | G06Q 20/4037 235/492 |
| 8,412,605 B2 * | 4/2013 | Griffin | ................... | G06Q 40/02 705/76 |
| 8,571,993 B2 * | 10/2013 | Kocher | ................ | G06Q 50/188 380/231 |
| 10,402,817 B1 | 9/2019 | Benkreira | | |
| 2008/0288405 A1 * | 11/2008 | John | .................... | G06Q 20/384 705/44 |
| 2008/0301019 A1 * | 12/2008 | Monk | ................ | G06Q 20/4016 705/35 |
| 2011/0264581 A1 * | 10/2011 | Clyne | .................... | G06Q 20/10 705/39 |
| 2012/0143754 A1 * | 6/2012 | Patel | .................... | G06Q 20/385 705/41 |
| 2012/0290482 A1 * | 11/2012 | Atef | ........................ | G10L 17/10 705/44 |
| 2013/0013513 A1 * | 1/2013 | Ledbetter | ............... | G06Q 40/12 705/44 |
| 2013/0104022 A1 * | 4/2013 | Coon | .................... | G06F 40/174 715/226 |
| 2014/0006284 A1 * | 1/2014 | Faith | ..................... | G06Q 20/40 705/44 |
| 2015/0317633 A1 | 11/2015 | Saunders et al. | | |
| 2016/0132880 A1 | 5/2016 | O'Regan et al. | | |
| 2017/0070484 A1 | 3/2017 | Kruse et al. | | |
| 2017/0132595 A1 | 5/2017 | Deutscher et al. | | |
| 2017/0161742 A1 | 6/2017 | Martin-Bale et al. | | |
| 2018/0130062 A1 | 5/2018 | O'Donnell et al. | | |
| 2018/0240143 A1 | 8/2018 | Salmon et al. | | |
| 2020/0118114 A1 | 4/2020 | Benkreira et al. | | |

* cited by examiner

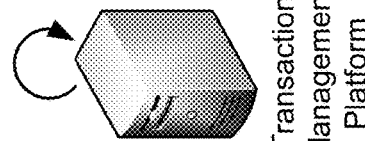

| Example URL Mapping | |
|---|---|
| URL | List of Merchant IDs |
| www.JohnDoeSports.com/3skd02d | M_ID_JDSports<br>M_ID_UniversityA<br>M_ID_CollegeAthletics<br>M_ID_FishingAdvice |
| • | • |

125
Determine first merchant ID

Transaction Management Platform

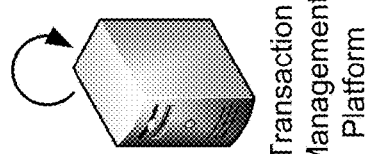

| Data Structure | | |
|---|---|---|
| Virtual T-Card 1 | Time Stamp 1 | Merchant ID 1 |
| Virtual T-Card 2 | Time Stamp 2 | Merchant ID 2 |
| • | • | • |
| Virtual T-Card M | Time Stamp M | Merchant ID N |

130
Establish association with virtual transaction card, first merchant ID, and time stamp Transaction Management Platform

FIG. 1B

RELAXED FRAUD DETECTION FOR TRANSACTIONS USING VIRTUAL TRANSACTION CARDS

RELATED APPLICATIONS

This application is a continuation of U.S. patent application Ser. No. 16/555,426, filed Aug. 29, 2019 (now U.S. Pat. No. 11,315,106), which is a continuation of U.S. patent application Ser. No. 16/159,223, filed Oct. 12, 2018 (now U.S. Pat. No. 10,402,817), the contents of each of which are incorporated herein by reference.

BACKGROUND

A transaction card (e.g., a debit card, a credit card, and/or the like) may enable a card holder to pay a merchant for goods and/or services. In some situations, a virtual transaction card may be used in place of the transaction card. The virtual transaction card may be capable of processing transactions with a controlled payment number (e.g., in place of a transaction card number of the transaction card) that may be available for a limited number of transactions and/or for a limited time period.

SUMMARY

According to some possible implementations, a method may include receiving, by a device and from an extension of a browser used by a user device, a request to generate a virtual transaction card. The request may include a time stamp and a uniform resource locator (URL) associated with a webpage of a website that is being displayed via the browser. The method may include generating, by the device, the virtual transaction card based on receiving the request. The method may include determining, by the device, a first merchant identifier for a merchant associated with the webpage being displayed via the browser. The method may include establishing, by the device, an association among a virtual transaction card identifier of the virtual transaction card, the time stamp associated with the request to generate the virtual transaction card, and the first merchant identifier for the merchant. The method may include providing, by the device, the virtual transaction card to the user device. The method may include receiving, by the device, an authorization request associated with a transaction that is made by the user device as part of a checkout procedure of the website. The authorization request may include the virtual transaction card identifier and a second merchant identifier. The method may include performing, by the device, a first authorization procedure to determine whether the first merchant identifier matches or satisfies a threshold level of similarity with the second merchant identifier. The method may include determining, by the device, whether to forego a second authorization procedure based on a result of the first authorization procedure. The device may forego the second authorization procedure if the first authorization procedure succeeds or is to perform the second authorization procedure if the first authorization procedure fails. The method may include causing, by the device, an authorization response to be provided to another device associated with the merchant. The authorization response may include an indication of whether the transaction is approved.

According to some possible implementations, a device may include one or more memories, and one or more processors, operatively coupled to the one or more memories, to receive, from a user device, a request to generate a virtual transaction card. The request may include a time stamp and a network address associated with a webpage of a website that is being displayed via a browser of the user device. The one or more processors may generate the virtual transaction card based on receiving the request. The one or more processors may determine a first merchant identifier for a merchant associated with the webpage being displayed via the browser. The one or more processors may update a data structure to associate a virtual transaction card identifier of the virtual transaction card, the time stamp associated with the request to generate the virtual transaction card, and the first merchant identifier for the merchant. The one or more processors may provide the virtual transaction card to the user device. The one or more processors may receive an authorization request associated with a transaction that is made by the user device as part of a checkout procedure of the website. The authorization request may include the virtual transaction card identifier and a second merchant identifier. The one or more processors may perform, based on receiving the authorization request, a first authorization procedure to determine whether the first merchant identifier matches or satisfies a threshold level of similarity with the second merchant identifier. The one or more processors may determine whether the transaction is occurring within a threshold time period after generating the virtual transaction card. The one or more processors may determine whether to forego a second authorization procedure based on a result of the first authorization procedure. The device may forego the second authorization procedure if the first authorization procedure succeeds or is to perform the second authorization procedure if the first authorization procedure fails. The one or more processors may provide, after determining whether to forego the second authorization procedure, an indication of whether the transaction has been approved.

According to some possible implementations, a non-transitory computer-readable medium may store instructions that include one or more instructions that, when executed by one or more processors of a device, cause the one or more processors to receive an authorization request associated with a transaction that is made by a user device as part of a checkout procedure of a website. The authorization request may include a virtual transaction card identifier of a virtual transaction card that is being used for the transaction and a first merchant identifier for a merchant associated with the website. The one or more instructions may cause the one or more processors to perform a first authorization procedure to determine whether the first merchant identifier, included in the authorization request, matches or satisfies a threshold level of similarity with a second merchant identifier associated with a request to generate the virtual transaction card. The request to generate the virtual transaction card may have occurred prior to receiving the authorization request. The one or more instructions may cause the one or more processors to determine whether to forego a second authorization procedure based on a result of the first authorization procedure. The device may forego the second authorization procedure if the first authorization procedure succeeds or is to perform the second authorization procedure if the first authorization procedure fails. The one or more instructions may cause the one or more processors to cause an authorization response to be provided to another device associated with the merchant, wherein the authorization response includes an indication of whether the transaction is approved.

BRIEF DESCRIPTION OF THE DRAWINGS

FIGS. 1A-1D are diagrams of an example implementation described herein.

DETAILED DESCRIPTION

Figure 1A:
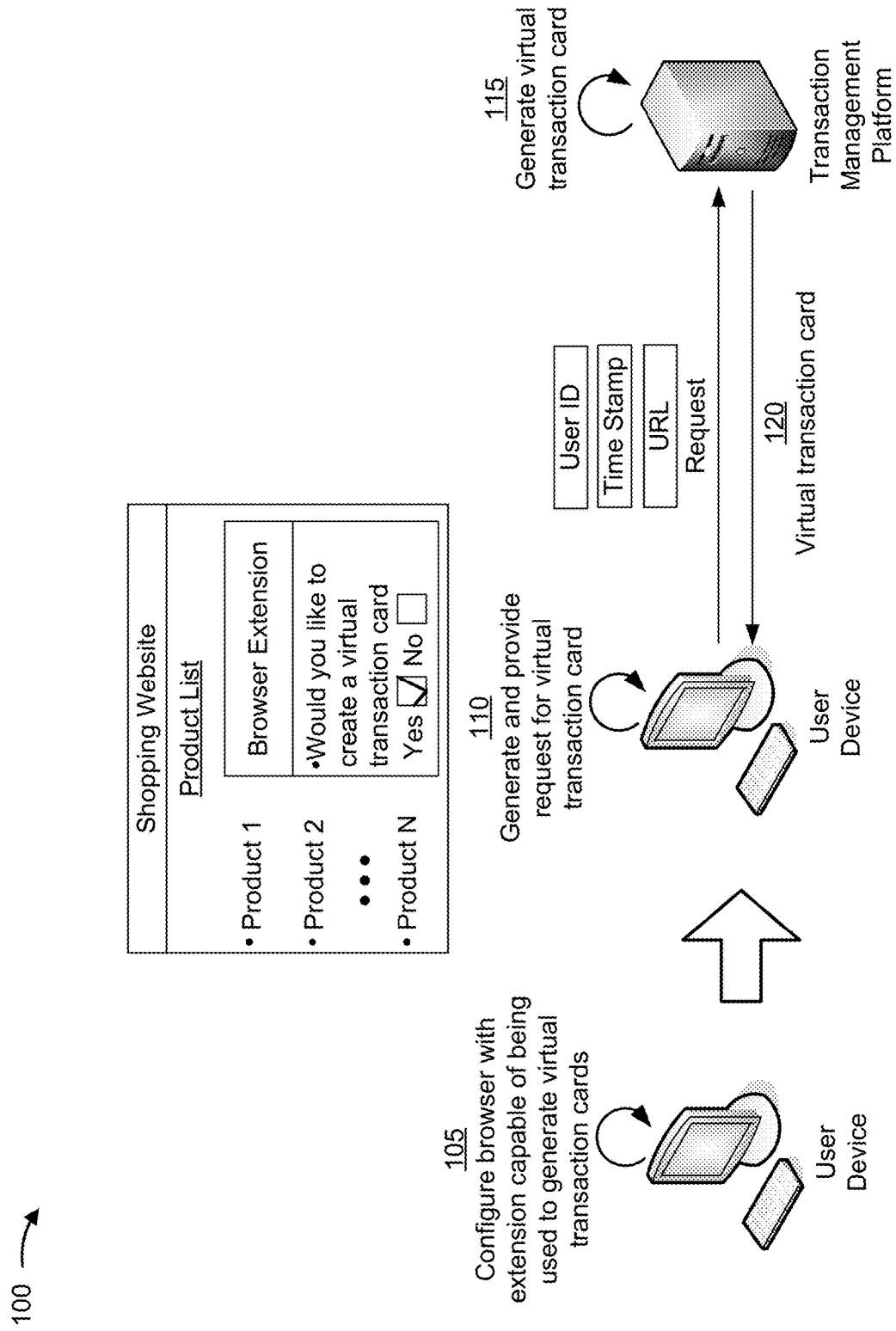

The following detailed description of example implementations refers to the accompanying drawings. The same reference numbers in different drawings may identify the same or similar elements.

A virtual transaction card may include a controlled payment number that may be used to process transactions, such as transactions made via the Internet. To reduce fraud, an organization allowing a card holder to use the virtual transaction card (e.g., in place of a normal transaction card) may deploy a series of authorization procedures designed to determine whether to authorize a transaction made with the virtual transaction card. For example, the series of authorization procedures may include an authorization procedure that asks the user one or more security questions, an authorization procedure that involves sending a user account (e.g., an electronic mail account) or a mobile device a security code (e.g., which may be input to a field displayed on a browser being used to make the transaction), an authorization procedure that selects a particular action or test based on a dollar value of the transaction (e.g., a larger transaction may require more difficult forms of authorization), and/or the like.

However, performing too many authorization procedures and/or performing authorization procedures with tests that are too difficult to pass may cause a large quantity of false card declines. For example, one or more extensive authorization procedures may be performed to authorize a transaction for an expensive product, which might cause the transaction to be wrongfully declined and an account of the card holder frozen. This creates a negative experience for the card holder while using the virtual transaction card (e.g., which may cause the card holder to seek out other organizations for banking services), wastes processing resources of devices used to decline the transaction and/or to retry the transaction, wastes resources of devices used to freeze and subsequently unfreeze the account of the card holder, and/or the like. Furthermore, when an authorization server receives a request to authorize a transaction, the authorization server often has a small window during which to perform the series of authorization procedures (e.g., 50 milliseconds). As such, time spent performing needless authorization procedures may make it difficult for the authorization server to provide a timely authorization response.

Some implementations described herein provide a transaction management platform to authorize a transaction by performing a first authorization procedure and by performing a second authorization procedure only if the first authorization does not succeed. For example, the transaction management platform may receive a request from a user device to generate a virtual transaction card. The request may include an identifier of the individual, a time stamp indicating a time at which the request is made, a network address (e.g., a uniform resource locator (URL)) of a website that is being displayed on a browser of the user device, and/or the like. In this case, the transaction management platform may generate the virtual transaction card using information included in the request. Additionally, the transaction management platform may update a data structure to associate values that may be used when performing the first authorization procedure. For example, the transaction management platform may determine a first merchant identifier of a merchant associated with the website that the user device had opened when the request to generate the virtual transaction card was made, and may update the data structure to associate the first merchant identifier with the virtual transaction card and the time stamp indicating the time at which the request to generate the virtual transaction card was made.

In some implementations, the user device may complete a checkout process of the website and may use the virtual transaction card to initiate a transaction with the merchant (e.g., a transaction to purchase a product or a service from the website). To complete the transaction, a merchant server may provide an authorization request to the transaction management platform. The authorization request may include virtual transaction card information for the virtual transaction card and a second merchant identifier (e.g., which the merchant may use when requesting payment from a bank of the individual). In this case, the transaction management platform may perform the first authorization procedure to verify that the transaction initiated by the user device is with the same merchant (or at the same website) that was identified when the virtual transaction card was generated, and to verify that the transaction is being made within a threshold time period after the virtual transaction card has been generated.

If the first authorization procedure fails, the transaction management platform may perform a second authorization procedure. If the first authorization procedure succeeds, the transaction management platform may forego performance of the second authorization procedure. Additionally, the transaction management platform may provide an authorization response to the merchant server indicating whether the transaction was successful, and the merchant server may provide an indication of whether the transaction was successful for display on the user device.

By foregoing the second authorization procedure when the first authorization procedure succeeds, the transaction management platform prevents the second authorization procedure from accidentally causing a false card decline of the transaction card of the individual. This conserves resources (e.g., processing resources, network resources, memory resources, and/or the like) that would be used to perform the second authorization procedure, conserves resources that would be used to freeze an account of the individual in the event of a false decline of the transaction card, conserves resources that would be used to retry the transaction, conserves resources that would be used to unfreeze the account of the individual (e.g., after the individual calls in to verify that the transaction is legitimate), and/or the like. Additionally, performing the first authorization, which was not previously performed, reduces instances of fraud, thereby conserving resources that would otherwise be used to generate alerts of fraud, generate reimbursements for fraud, generate notifications of fraud, and/or the like.

Furthermore, several different stages of the process described herein are automated, which removes human subjectivity and waste from the process, and which improves speed and efficiency of the process and conserves computing resources (e.g., processor resources, memory resources, and/or the like). For example, by automating the process for determining the first merchant identifier (e.g., which is needed to perform the first authorization procedure), the transaction management platform conserves computing resources relative to an inferior device or platform that has to be used in conjunction with manual assistance. Additionally, implementations described herein use a rigorous, computerized process to perform tasks or roles that were not previously performed or were previously performed using subjective human intuition or input.

FIGS. 1A-1D are diagrams of an example implementation 100 described herein. For example, example implementation 100 may include a user device, a merchant server, a first authorization server (shown as Authorization Server A), and a transaction management platform that may serve as a second authorization server.

As shown in FIG. 1A, and by reference number 105, the user device may be configured with an extension (e.g., a browser extension or add-on) that is capable of being used to generate virtual transaction cards. For example, an individual may interact with the user device to visit a website to download an installation file that, when executed on the user device, installs the extension as part of the browser. The extension may, based on an event described below, display a message (e.g., via the browser) asking if the individual would like to create a virtual transaction card. The message may be a pop-up window that is provided in addition to one or more browser windows that the individual has opened, may be embedded as part of a window of a particular website, and/or the like.

As shown by reference number 110, the user device may generate and provide the transaction management platform with a request for a virtual transaction card. For example, the user device, using the extension of the browser (e.g., referred to herein as a browser extension), may provide a message for display via the browser that asks the individual whether the individual would to create a virtual transaction card. In this case, if the individual selects or inputs that he or she would like to have the virtual transaction card created, the user device may generate the request for the virtual transaction card, and may provide the request to the transaction management platform.

The request may include an identifier of the individual (e.g., a name, an account identifier of the individual, a device identifier of the user device, and/or the like), a time stamp indicating a time at which the request is generated or provided, an identifier of a website that is being displayed by the browser of the user device (e.g., a uniform resource locator (URL) of the website, a network address of a device associated with the website, etc.), and/or the like.

In some implementations, the individual may input personal information (e.g., the identifier of the individual) as part of the message displayed on the browser. In some implementations, the personal information of the individual may be pre-configured to the browser extension or a data structure accessible to the user device, such that the user device is able to automatically generate the request for the virtual transaction card without user input.

In some implementations, the user device (e.g., using the browser extension) may provide the message for display on the browser based on an event. For example, the user device may provide the message for display on the browser based on the individual launching a web browser, based on the individual using the browser to visit a website, based on an individual visiting a particular webpage of a website (e.g., a checkout webpage), based on the individual interacting with an aspect of the webpage (e.g., a button triggering a checkout process), based on the individual manually requesting the message to be displayed by clicking on a button shown on the browser, and/or the like.

As shown as an example, an individual may interact with a user interface to launch the browser and to visit a shopping website that offers products and/or services (shown as Product 1, Product 2, . . . , Product N). In this example, the browser extension may, upon the individual visiting a homepage of the shopping website, display a message asking the individual if he or she would like to create a virtual transaction card. If the individual selects or inputs a response indicating that he or she would like to create the virtual transaction card, a request to generate the virtual transaction card may be provided to the transaction management platform.

As another example, the browser extension may be configured to display the message only when the individual visits a particular webpage of a website, such as a checkout webpage. In this example, while the individual is browsing the website, the browser extension may monitor content of the website to identify whether the individual is at a checkout webpage of a website. For example, the browser extension may be configured to detect images and/or information that may be commonly found in checkout webpages, such as information requesting personal information of the individual (e.g., a field asking for a name of the individual, a field asking for an address of the individual, a field asking for the individual to input payment information, and/or the like). As such, when the individual visits the checkout webpage, the browser extension may identify that the individual is accessing a checkout webpage and may display the message asking if the individual would like to generate a virtual transaction card.

As shown by reference number 115, the transaction management platform may generate the virtual transaction card. For example, the transaction management platform may generate the virtual transaction card based on receiving the request. In this case, the transaction management platform may process the request to obtain the identifier of the individual and may use the identifier of the individual to locate account information of the individual. As an example, the account information of the individual may be securely stored via a data structure accessible to the transaction management platform or via another device that the transaction management platform may interact with to request the account information.

Additionally, the transaction management platform may generate the virtual transaction card in a manner that links virtual transaction card information with the account of the individual. The virtual transaction card information may include a virtual transaction card identifier, a security code, an expiration value (e.g., the virtual transaction card may be valid for only a threshold time period, a threshold number of transactions, etc.), a restrictions value (e.g., the virtual transaction card may be valid for purchasing a product offered in a first country but not for purchasing the product in a second country, the virtual transaction card may be valid for purchases up to a certain dollar value, and/or the like), and/or the like.

In some implementations, the process for generating the virtual transaction card may include an authorization procedure. For example, before generating a virtual transaction card that is linked to an account of the individual, the transaction management platform (or another device) may perform an authorization procedure to confirm that the individual requesting the virtual transaction card is an authorized user.

As shown by reference number 120, the transaction management platform may provide the virtual transaction card to the user device. For example, the transaction management platform may provide the virtual transaction card to the user device, such that the browser extension of the user device is able to utilize the virtual transaction card when the individual engages in transactions with the website (e.g., by using the virtual transaction card to purchase a product or a service from the website).

In this way, the transaction management platform generates the virtual transaction card based on receiving the request from the browser extension.

As shown in FIG. 1B, the transaction management platform may perform one or more setup actions that allow the transaction management platform to authorize transactions by performing a first authorization procedure (e.g., as described in detail further herein). As shown by reference number 125, the transaction management platform may determine a first merchant identifier. For example, the transaction management platform may be configured with or have access to a data structure that stores a list of merchant identifiers for a group of merchants. In this case, the transaction management platform may (e.g., based on receiving the request) use a mapping technique to determine which identifier, of the list of merchant identifiers, is an identifier for the merchant associated with the website that the browser of the user device was accessing at the time when the request for the virtual transaction card was made.

In some implementations, the transaction management platform may determine the first merchant identifier using a URL mapping technique. For example, the transaction management platform may process a URL associated with the website (e.g., which may be included in the request provided by the user device) to identify search parameters that may be used to determine the first merchant identifier. The search parameters may be a domain name, a subdomain name, and/or the like. In this case, the transaction management platform may compare the search parameters and a list of merchant identifiers stored by the data structure and may determine that a particular identifier that matches the search parameters is the first merchant identifier. In some cases, the search parameters may not correlate directly to the list of merchant identifiers and may only need to satisfy a threshold level of similarity with one of the merchant identifiers included in the list (e.g., by matching a threshold number of similar characters, a threshold number of similar first letters of words, and/or the like).

As shown as an example, the transaction management platform may process a URL (e.g., www.JohnDoeSports.com/3skd02d) to identify a domain name (e.g., JohnDoeSports) and may use the domain name as the search parameters. In this case, the transaction management platform may compare the domain name and the list of merchant identifiers stored by the data structure. The transaction management platform may determine that a particular identifier satisfies a threshold level of similarity with the domain name (e.g., M_ID_JDSports), and may use the particular identifier as the first merchant identifier.

In some cases, the transaction management platform may use, as the list of merchant identifiers, a list of merchant codes that the merchants use when processing transactions. For example, when an individual purchases a product from a website, a merchant server for a merchant who owns the website might provide a merchant code to a server associated with a bank of the individual purchasing the product. The merchant code may allow the bank of the individual to identify the merchant as the recipient who is to receive payment as part of the transaction. As such, the transaction management platform may have access to the list of merchant codes from past transactions between merchants and individuals and may be able to use the list of merchant codes as merchant identifiers.

In some implementations, the transaction management platform may determine the first merchant identifier using a website keyword mapping technique. For example, in some cases, the transaction management platform may be unable to determine the first merchant identifier by processing a URL of the website. In this case, the transaction management platform may use a data mining technique to analyze content included within the website and to identify one or more keywords. As an example, the transaction management platform might analyze the content to identify nouns that might be descriptive of a name of a merchant, might select particular nouns as the one or more keywords (e.g., a noun in a header of a website may be more likely to identify a merchant name than a noun in another portion of the website), and/or the like. Additionally, the transaction management platform may use the one or more keywords to search the list of merchant identifiers, and may select, as the first merchant identifier for the merchant, an identifier that matches with or satisfies a threshold level of similarity with the one or more keywords.

As an example, assume that John is a merchant who sells what he believes to be artifacts belonging to Amazons (i.e., the tribe of female warriors described in Greek Mythology). Further assume that John establishes a business name of "Artifacts of the Amazons." In this case, John may be unable to retain the URL Amazon.com as this URL belongs to another organization but ultimately decides to purchase the URL JohnsGoods4Sale.com to give himself the opportunity to sell artifacts in other name spaces. Further assume that a merchant code used to process transactions made through JohnsGoods4Sale.com is AOTA (i.e., an acronym for his business name). In this example, the transaction management platform may be unable to determine that AOTA is the first merchant identifier by simply processing the URL. Instead, the transaction management platform may use a data mining technique to analyze content included in the website and may identify one or more keywords that may be used as the search parameters. For example, the transaction management platform may identify the terms Artifacts of the Amazon via a header of the website and may be able to determine that AOTA is the first merchant identifier by comparing Artifacts of the Amazon to the list of merchant identifiers.

In some implementations, the transaction management platform may identify the first merchant identifier (e.g., without having to make a real-time determination). For example, the transaction management platform may have previously determined the first merchant identifier for the website during one of the individual's previous visits to the website. As such, the transaction management platform may have established an association with the first merchant identifier and a URL of the website (e.g., using a data structure, as further described below), such that when the individual makes subsequent visits to the website, the transaction management platform simply needs to identify the first merchant identifier by using the URL to search the data structure. This conserves processing resources and/or network resources that would otherwise be used to perform a more extensive analysis.

As shown by reference number 130, the transaction management platform may establish an association with the virtual transaction card, the first merchant identifier, and/or the time stamp indicating the time period at which the request for the virtual transaction card was made. For example, the transaction management platform may update a data structure in a manner that associates virtual transaction card information for the virtual transaction card, the first merchant identifier, and the time stamp. An illustration of this association is provided in FIG. 1B.

In some cases, the data structure might associate two separate types of merchant identifiers. For example, the transaction management platform might use the data structure to associate a first type of merchant identifier and a second type of merchant identifier. The first type of merchant identifier, as described above, may identify the merchant associated with the website that the individual was visiting when the request for the virtual transaction card was made. The second merchant identifier may be the merchant code that is used by merchants when processing transactions with customers.

In this way, the transaction management platform may use the data structure to establish associations between values that may be used as part of a first authorization procedure, as described further herein.

Figure 1C:
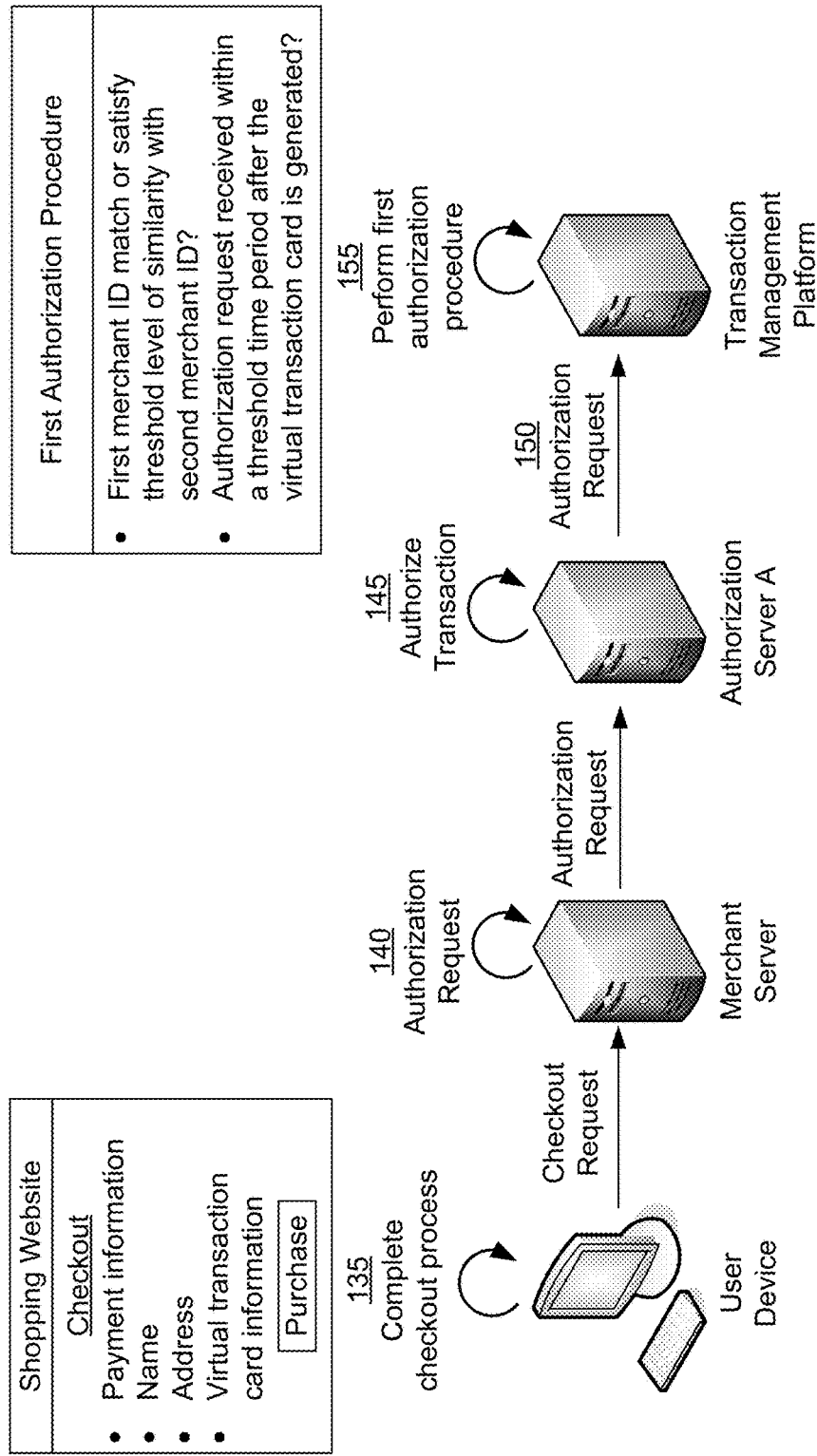

As shown in FIG. 1C, and by reference number 135, the individual may use the user device to complete a checkout process that is needed for a transaction between the individual and the merchant. For example, the individual may navigate through one or more checkout webpages of the website to initiate a transaction to purchase a product or a service from the website.

In some implementations, the individual may select the virtual transaction card as a method of payment, and, upon completion of the checkout process, may cause a checkout request to be provided to the merchant server. In some implementations, the individual may manually input virtual transaction card information into fields of the website to complete the checkout process. In some implementations, the user device (e.g., using the browser extension) may automatically populate payment information of the virtual transaction card. For example, the browser extension may monitor for fields associated with the checkout process (e.g., a field asking the user to input a particular type of payment), and may, upon detection of the fields, automatically populate the fields with virtual transaction card information of the virtual transaction card.

As shown by reference number 140, the merchant server may generate and provide an authorization request to the first authorization server (shown as Authorization Server A). For example, to authorize the transaction, the merchant server may generate and provide an authorization request to one or more authorization servers, such as an authorization server associated with an organization that manages a payment network used for processing transactions (e.g., Authorization Server A), an authorization server associated with an organization serving as a bank of the individual (e.g., which may be included as part of the transaction management platform), and/or the like. In this case, the merchant server may include, within the authorization request, the virtual transaction card information for the virtual transaction card, a merchant code (referred to herein as a second merchant identifier) to identify the merchant that is requesting payment, a time stamp indicating a time at which the authorization request is being generated, and/or the like.

In some implementations, the merchant server may provide the authorization request to the first authorization server. In this case, the first authorization server may be responsible for authorizing the transaction and forwarding the authorization request to a second authorization server associated with the bank of the individual (e.g., the transaction management platform). In some implementations, the merchant server may provide the authorization request to multiple authorization servers.

As shown by reference number 145, the first authorization server may authorize the transaction. For example, the first authorization server may be associated with an organization that manages a payment network used for processing transactions. In this case, the first authorization server may perform one or more authorization procedures to determine whether to authorize the transaction. As shown by reference number 150, the first authorization server may provide the authorization request to the transaction management platform.

As shown by reference number 155, the transaction management platform may perform the first authorization procedure. For example, the transaction management platform may, based on receiving the authorization request, perform the first authorization procedure by determining whether one or more rules are satisfied. The one or more rules may include a first rule indicating that the merchant or website involved in the transaction with the individual has to be the same merchant or website involved when the virtual transaction card was generated, a second rule indicating that the transaction has to be made within a threshold time period after the virtual transaction card has been generated, and/or the like.

In some implementations, the transaction management platform may determine whether the first rule is satisfied. For example, the transaction management platform may reference the data structure to determine whether the merchant or website involved in the transaction with the individual is the same merchant or website involved when the virtual transaction card was generated.

As an example, assume the data structure associates the virtual transaction card information of the virtual transaction card, the time stamp, and one or more merchant identifiers for the merchant (e.g., the first merchant identifier and/or the second merchant identifier (i.e., the merchant code)). In this example, the transaction management platform may use the second merchant identifier included in the authorization request to search the data structure to identify that the second merchant identifier is stored in association with the first merchant identifier, the virtual transaction card information, and/or the time stamp. Because the one or more merchant identifiers are stored in association with the virtual transaction card and the time stamp, the transaction management platform is able to conclude that the merchant or website involved in the transaction with the individual is the same merchant or website involved when the virtual transaction card was generated. In some cases, the transaction management platform may search the data structure using the virtual transaction card information (e.g., instead of the merchant identifier).

Additionally, or alternatively, the transaction management platform may determine whether the second rule is satisfied. For example, the transaction management platform may reference the data structure to determine whether the transaction has been made within a threshold time period after the virtual transaction card has been generated. In this case, the transaction management platform may reference the data structure in a manner similar to that described above to identify the time stamp indicating the time period at which the request for the virtual transaction card was made. Additionally, the transaction management platform may compare the time stamp and a second time stamp which indicates a time at which the authorization request was generated, a time at which the authorization request was received, a time at which the first authorization procedure is being performed, and/or the like. If a difference between the time stamp and the second time stamp satisfies the threshold time period, then the transaction management platform may determine that second rule is satisfied.

In some implementations, the threshold time period may be configured based on an event used to trigger the generation of the virtual transaction card. For example, in one situation, the user device may be configured to prompt the individual whether the individual would like to create the virtual transaction card based on the individual visiting a particular website (e.g., a homepage of a website). In a second situation, the user device may be configured to prompt the individual based on the individual visiting a checkout webpage of the website. As such, the threshold time period may be configured to a longer time period for the first situation than with the second situation (e.g., because in the first situation, the user may need a certain amount of time to explore the website to identify a product or service that is to be purchased).

In some implementations, the threshold time period may be an expiration time stamp that is configured to the transaction management platform. In this case, the transaction management platform may compare a current time stamp and the expiration time stamp to determine whether the current time stamp indicates a time period occurring before a time period indicated via the expiration time stamp. This conserves processing resources and/or network resources relative to other implementations described herein.

In this way, the transaction management platform performs the first authorization procedure based on receiving the authorization request.

Figure 1D:
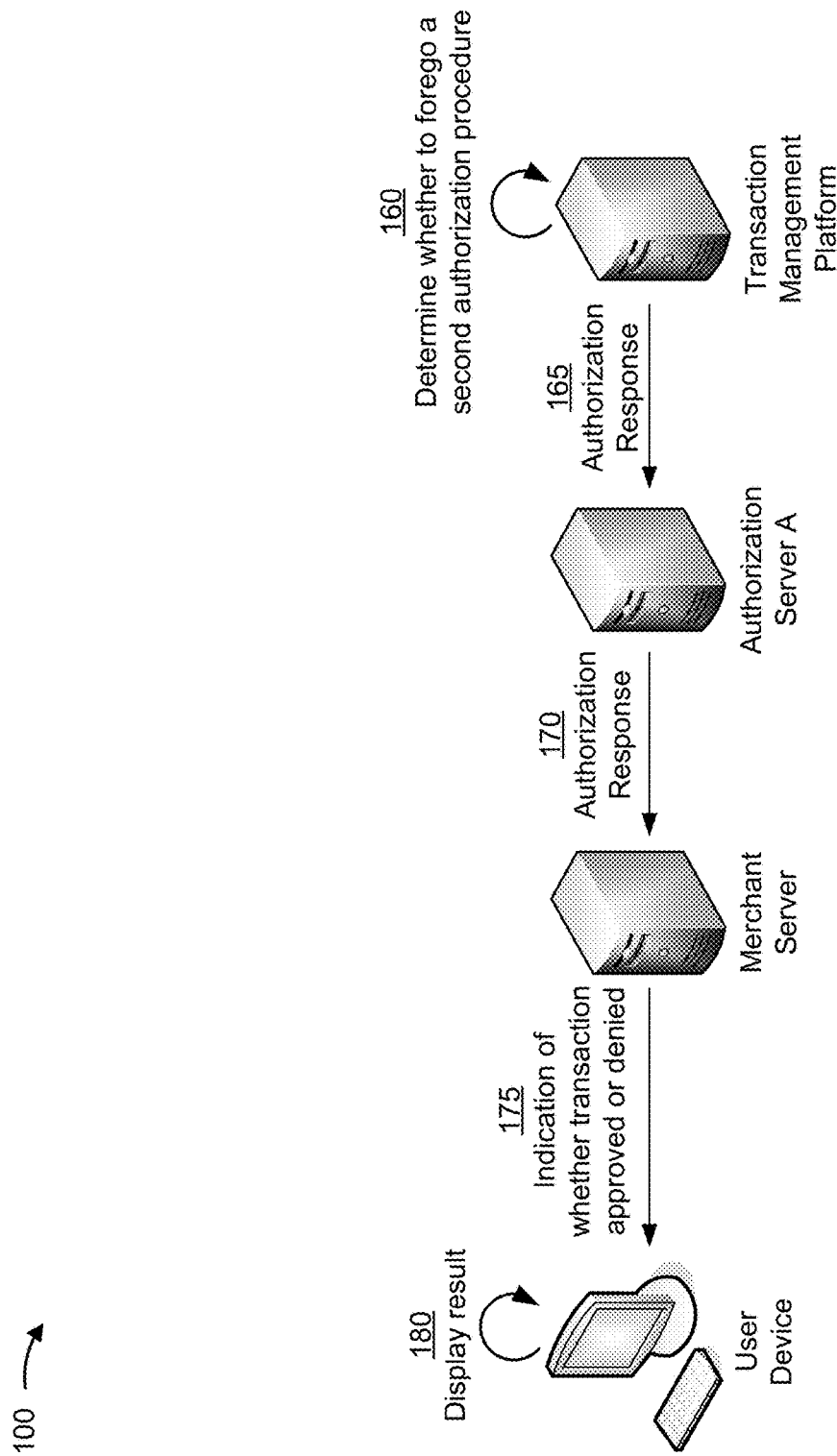

As shown in FIG. 1D, and by reference number 160, the transaction management platform may determine whether to forego a second authorization procedure. For example, the transaction management platform may determine to forego the second authorization procedure if the first authorization procedure succeeds. The second authorization procedure may include an authorization procedure to determine whether a dollar amount of a transaction satisfies a threshold amount, an authorization procedure to determine a country in which the transaction is being made, an authorization procedure to determine whether the transaction aligns with one or more purchasing patterns or purchasing habits associated with the individual, an authorization procedure capable of causing the transaction to be approved while concurrently locking an account of the individual (e.g., whereby additional authorization procedures may be required to unlock the account), and/or the like.

In some implementations, the transaction management platform may determine to forego multiple authorization procedures. In some implementations, the transaction management platform may perform a second authorization procedure but may forego a third authorization procedure.

In some implementations, the transaction management platform may selectively determine which authorization procedures to perform and/or which authorization procedures to forego. For example, the transaction management platform may selectively determine which authorization procedures to perform and/or to forego based on a value identified during the first authorization procedure. In this case, the transaction management platform may perform the first authorization procedure, and, based on a degree to which the one or more rules of the first authorization procedure are satisfied (or not satisfied), may select particular authorization procedures to perform and/or to forego.

As an example, if the transaction has to be made within fifteen minutes of the creation of the virtual transaction card, the transaction management platform may selectively determine which authorization procedures to perform and/or to forego based on a degree to which the fifteen minute threshold is satisfied (or not satisfied). For example, if an actual time between the virtual transaction card being generated and the authorization request being received is fourteen minutes and 58 seconds, the transaction management platform might forgo a second authorization procedure but may still perform a third authorization. Conversely, if the actual time between the virtual transaction card being generated and the authorization request being received is one minute, the transaction management platform might forego the second authorization procedure and the third authorization procedure. In this way, the transaction management platform conserves resources relative to performing needless authorization procedures.

As shown by reference number 165, the transaction management platform may provide an authorization response to the first authorization server. For example, the transaction management platform may provide a response indicating whether the transaction has been approved or denied, a reason why the transaction has been approved or denied, and/or the like.

As shown by reference number 170, the first authorization server may provide the authorization response to the merchant server. For example, the first authorization server may provide a response indicating that the transaction has been approved if authorization procedures performed by both the first authorization procedure and the transaction management platform succeeded. If an authorization procedure performed by the first authorization server and/or the transaction management platform did not succeed, the first authorization server may provide the merchant server with an authorization response indicating that the transaction was denied, the reason why the transaction was denied, and/or the like.

As shown by reference number 175, the merchant server may provide an indication of whether the transaction was approved or denied to the user device. For example, the merchant server may process the authorization response to determine whether the transaction has been approved or denied and may provide an indication of whether the transaction has been approved or denied to the user device. As shown by reference number 180, this may cause the user device to display the indication of whether the transaction has been approved or denied via the browser (e.g., as a message displayed on the website, as a pop-up message separate from the website, etc.).

In some implementations, the transaction management platform may perform one or more actions based on a result of one or more authorization procedures. For example, the transaction management platform may, based on one or more authorization procedures failing (e.g., the first authorization procedure, one or more additional authorization procedures, etc.), cause the individual's account to be locked. In this case, the transaction management platform may have permission to automatically lock the account of the individual or may generate and provide instructions to another device that has permission to lock the account of the individual.

Additionally, or alternatively, and provided as another example, the transaction management platform may contact the individual to indicate that the account has been locked. In this case, the transaction management platform may contact the individual via a short message service (SMS)

message, via an electronic mailing address, via a personal message to the account of the individual (e.g., which may be viewable via online banking), and/or the like.

Additionally, or alternatively, and provided as another example, the transaction management platform may flag the website as potentially fraudulent. This may allow the transaction management platform to perform heighted levels of authorization procedures for subsequent transaction made through the website. Additionally, or alternatively, and provided as another example, the transaction management platform may report the website to a security device or a device associated with law enforcement, may cause the security device to update a configuration setting (e.g., a setting that includes a list of websites to which to automatically deny transactions), and/or the like.

In this way, the transaction management platform may selectively perform the second authorization procedure based on whether the first authorization procedure succeeded. By foregoing the second authorization procedure, the transaction management platform prevents the second authorization procedure from accidentally causing a false card decline associated with an account of the individual. This conserves resources (e.g., processing resources, network resources, memory resources, and/or the like) that would be used to perform the second authorization procedure, conserves resources that would be used to freeze an account of the individual in the event of a false card decline, conserves resources that would be used to unfreeze the account of the individual after a determination is made that fraud is not present, and/or the like.

As indicated above, FIGS. 1A-1D are provided merely as an example. Other examples are possible and may differ from what was described with regard to FIGS. 1A-1D. For example, there may be additional devices and/or networks, fewer devices and/or networks, different devices and/or networks, or differently arranged devices and/or networks than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) of example implementation 100 may perform one or more functions described as being performed by another set of devices of example implementation 100.

Figure 2:
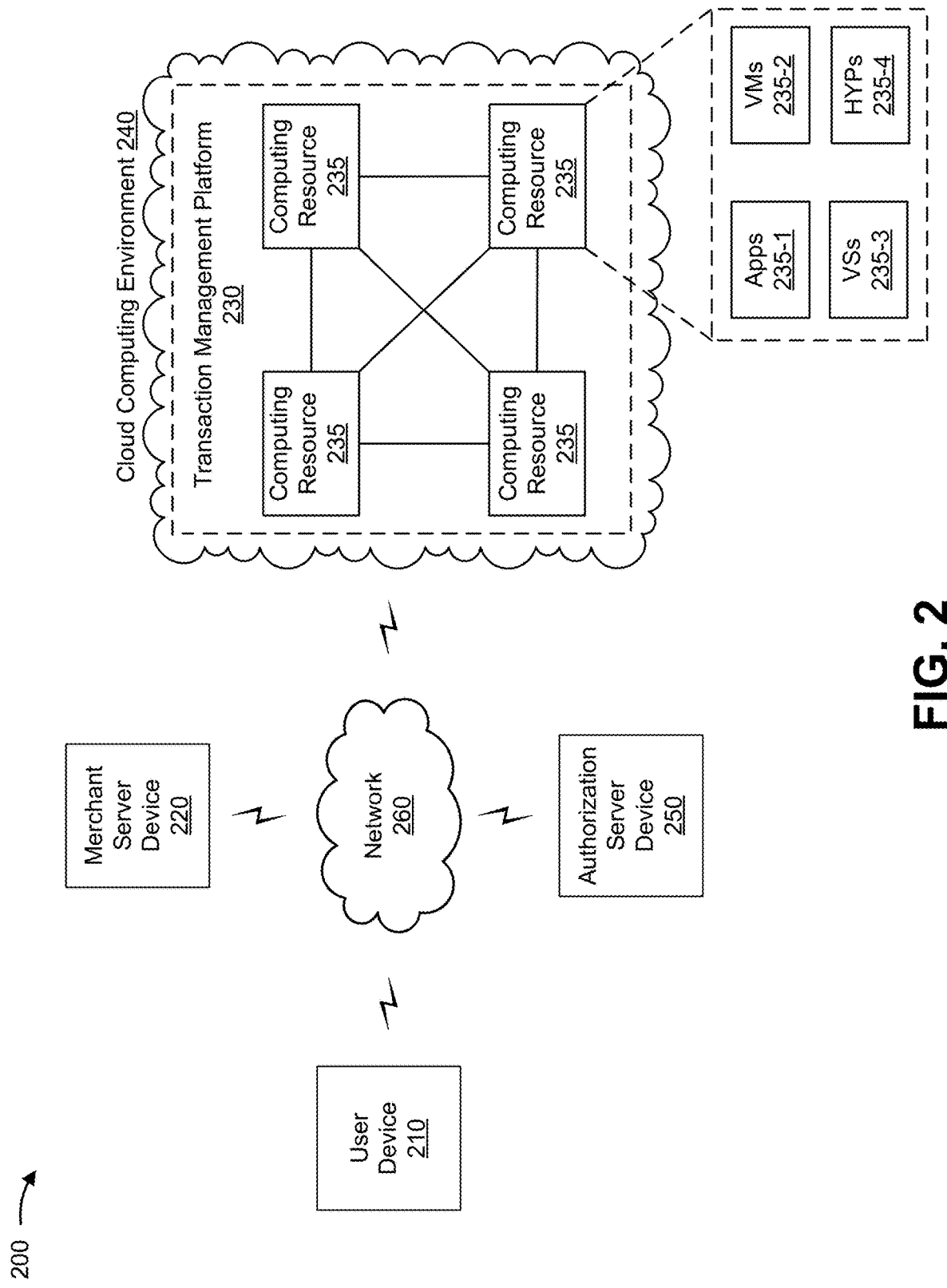
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a merchant server device 220, a transaction management platform 230 hosted within a cloud computing environment 240, an authorization server device 250, and/or a network 260. Devices of environment 200 may interconnect via wired connections, wireless connections, or a combination of wired and wireless connections.

User device 210 includes one or more devices capable of receiving, generating, storing, processing, and/or providing information associated with a virtual transaction card. For example, user device 210 may include a communication and/or computing device, such as a mobile phone (e.g., a smart phone, a radiotelephone, etc.), a laptop computer, a tablet computer, a handheld computer, a server computer, a gaming device, a wearable communication device (e.g., a smart wristwatch, a pair of smart eyeglasses, etc.), or a similar type of device. In some implementations, user device 210 may be configured with an extension to a browser (e.g., a web browser) that is capable of generating and providing transaction management platform 230 with a request to generate the virtual transaction card. In some implementations, user device 210 may interact with merchant server device 220 to perform a checkout process associated with a website. In some implementations, user device 210 may receive and display an indication of whether a transaction was approved.

Merchant server device 220 includes one or more devices capable of receiving, storing, generating, determining, and/or providing information associated with the virtual transaction card. For example, merchant server device 220 may include a server device or a group of server devices. In some implementations, merchant server device 220 may support a website that provides products and/or services for sale to users. In some implementations, merchant server device 220 may provide an authorization request to authorization server device 250 and/or transaction management platform 230. In some implementations, merchant server device 220 may receive an authorization response from authorization server device 250 and/or transaction management platform 230.

Transaction management platform 230 includes one or more devices capable of receiving, storing, generating, determining, and/or providing information associated with the virtual transaction card. For example, transaction management platform 230 may include a server device (e.g., a host server, a web server, an application server, etc.), a data center device, or a similar device. In some implementations, transaction management platform 230 may generate and provide user device 210 with the virtual transaction card. In some implementations, transaction management platform 230 may perform a first authorization procedure and may forego performance of a second authorization procedure.

In some implementations, as shown, transaction management platform 230 may be hosted in cloud computing environment 240. Notably, while implementations described herein describe transaction management platform 230 as being hosted in cloud computing environment 240, in some implementations, transaction management platform 230 might not be cloud-based (i.e., may be implemented outside of a cloud computing environment) or may be partially cloud-based.

Cloud computing environment 240 includes an environment that hosts transaction management platform 230. Cloud computing environment 240 may provide computation, software, data access, storage, etc. services that do not require end-user knowledge of a physical location and configuration of system(s) and/or device(s) that hosts transaction management platform 230. As shown, cloud computing environment 240 may include a group of computing resources 235 (referred to collectively as "computing resources 235" and individually as "computing resource 235").

Computing resource 235 includes one or more personal computers, workstation computers, server devices, or another type of computation and/or communication device. In some implementations, computing resource 235 may host transaction management platform 230. The cloud resources may include compute instances executing in computing resource 235, storage devices provided in computing resource 235, data transfer devices provided by computing resource 235, and/or the like. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, and/or the like.

Application 235-1 may include one or more software applications that may be provided to or accessed by user device 210, merchant server device 220, and/or authorization server device 250. Application 235-1 may eliminate a need to install and execute the software applications on these devices. For example, application 235-1 may include software associated with transaction management platform 230 and/or any other software capable of being provided via cloud computing environment 240. In some implementations, one application 235-1 may send/receive information to/from one or more other applications 235-1, via virtual machine 235-2.

Virtual machine 235-2 may include a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program and may support a single process. In some implementations, virtual machine 235-2 may execute on behalf of another device (e.g., user device 210, merchant server device 220, authorization server device 250, etc.), and may manage infrastructure of cloud computing environment 240, such as data management, synchronization, or long-duration data transfers.

Virtualized storage 235-3 may include one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 may provide hardware virtualization techniques that allow multiple operating systems (e.g., "guest operating systems") to execute concurrently on a host computer, such as computing resource 235. Hypervisor 235-4 may present a virtual operating platform to the guest operating systems and may manage the execution of the guest operating systems. Multiple instances of a variety of operating systems may share virtualized hardware resources.

Authorization server device 250 includes one or more devices capable of receiving, storing, generating, determining, and/or providing information associated with the virtual transaction card. For example, authorization server device 250 may include a server device or a group of server devices. In some implementations, authorization server device 250 may be associated with an organization that has issued credit to an individual. In some implementations, authorization server device 250 device may be part of transaction management platform 230.

Network 260 includes one or more wired and/or wireless networks. For example, network 260 may include a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
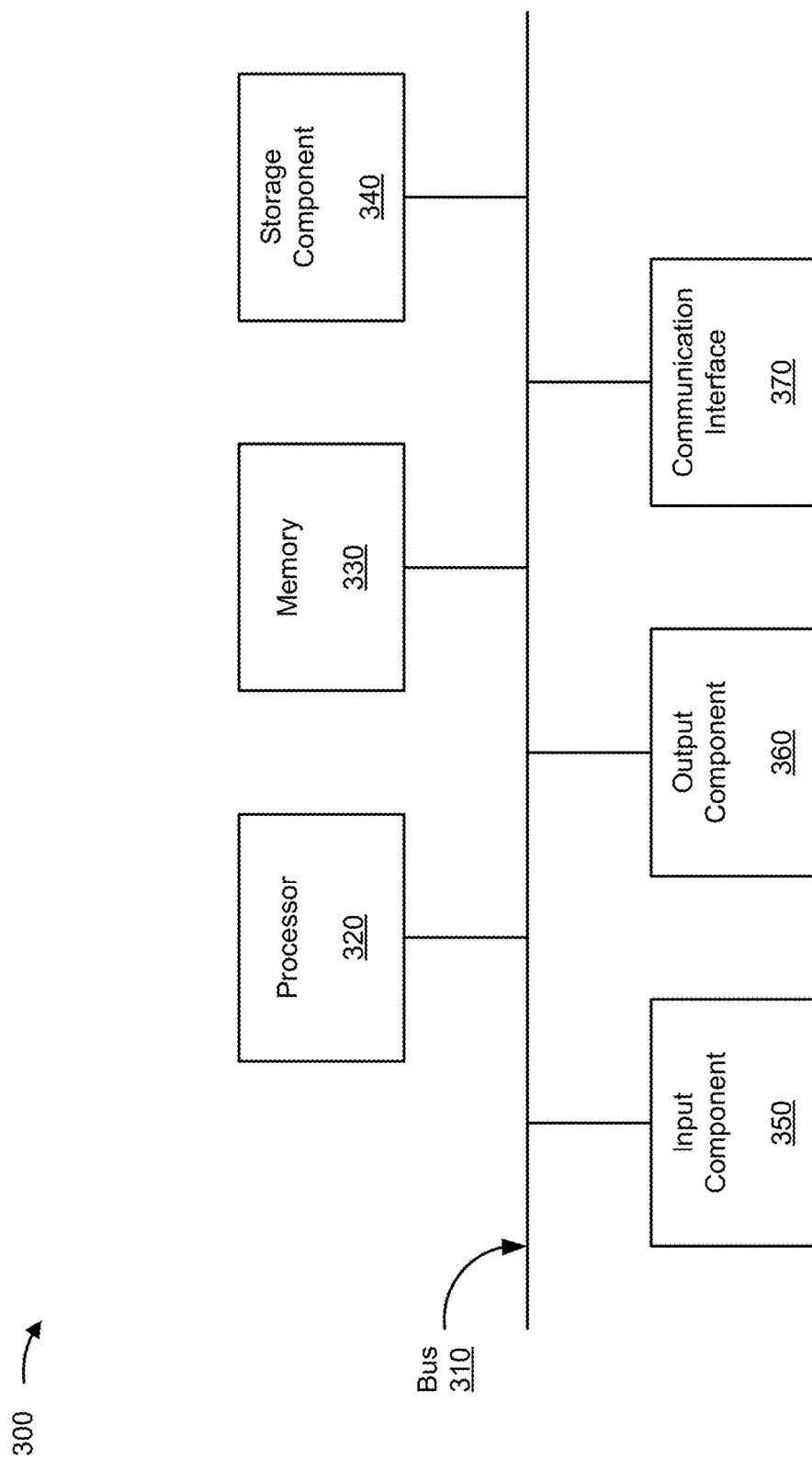
FIG. 3 is a diagram of example components of one or more devices of FIG. 2.

FIG. 3 is a diagram of example components of a device 300. Device 300 may correspond to user device 210, merchant server device 220, transaction management platform 230, and/or authorization server device 250. In some implementations, user device 210, merchant server device 220, transaction management platform 230, and/or authorization server device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
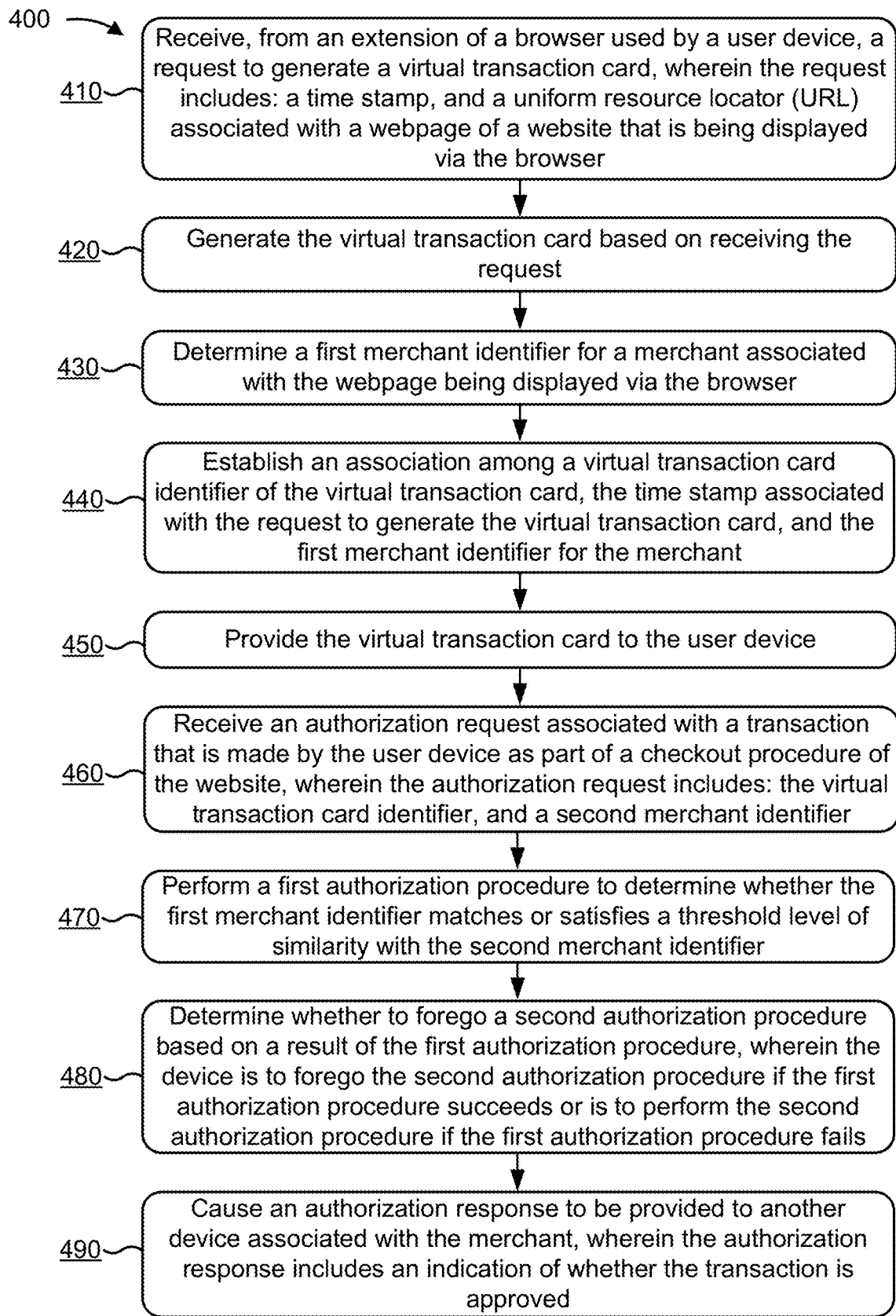
FIGS. 4-6 are flow charts of an example process for authorizing a transaction by performing a first authorization procedure and by selectively performing a second authorization procedure based on whether the first authorization succeeds.

FIG. 4 is a flow chart of an example process 400 for authorizing a transaction by performing a first authorization procedure and by selectively performing a second authorization procedure based on whether the first authorization succeeds. In some implementations, one or more process blocks of FIG. 4 may be performed by a transaction management platform (e.g., transaction management platform 230). In some implementations, one or more process blocks of FIG. 4 may be performed by another device or a group of devices separate from or including the transaction management platform, such as a user device (e.g., user device 210), a merchant server device (e.g., merchant server device 220), an authorization server device (e.g., authorization server device 250), and/or the like.

As shown in FIG. 4, process 400 may include receiving, from an extension of a browser used by a user device, a request to generate a virtual transaction card, wherein the request includes a time stamp, and a uniform resource locator (URL) associated with a webpage of a website that is being displayed via the browser (block 410). For example, the transaction management platform (e.g., using computing resource 235, processor 320, memory 330, storage component 340, input component 350, communication interface 370, and/or the like) may receive, from an extension of a browser used by the user device, a request to generate a virtual transaction card, as described above in connection with FIGS. 1A-1D. In some implementations, the request may include a time stamp, and a uniform resource locator (URL) associated with a webpage of a website that is being displayed via the browser.

As further shown in FIG. 4, process 400 may include generating the virtual transaction card based on receiving the request (block 420). For example, the transaction management platform (e.g., using computing resource 235, processor 320, memory 330, storage component 340, and/or the like) may generate the virtual transaction card based on receiving the request, as described above in connection with FIGS. 1A-1D.

As further shown in FIG. 4, process 400 may include determining a first merchant identifier for a merchant associated with the webpage being displayed via the browser (block 430). For example, the transaction management platform (e.g., using computing resource 235, processor 320, memory 330, storage component 340, and/or the like) may determine a first merchant identifier for a merchant associated with the webpage being displayed via the browser, as described above in connection with FIGS. 1A-1D.

As further shown in FIG. 4, process 400 may include establishing an association among a virtual transaction card identifier of the virtual transaction card, the time stamp associated with the request to generate the virtual transaction card, and the first merchant identifier for the merchant (block 440). For example, the transaction management platform (e.g., using computing resource 235, processor 320, memory 330, storage component 340, and/or the like) may establish an association among a virtual transaction card identifier of the virtual transaction card, the time stamp associated with the request to generate the virtual transaction card, and the first merchant identifier for the merchant, as described above in connection with FIGS. 1A-1D.

As further shown in FIG. 4, process 400 may include providing the virtual transaction card to the user device (block 450). For example, the transaction management platform (e.g., using computing resource 235, processor 320, memory 330, storage component 340, output component 360, communication interface 370, and/or the like) may provide the virtual transaction card to the user device, as described above in connection with FIGS. 1A-1D.

As further shown in FIG. 4, process 400 may include receiving an authorization request associated with a transaction that is made by the user device as part of a checkout procedure of the website, wherein the authorization request includes the virtual transaction card identifier, and a second merchant identifier (block 460). For example, the transaction management platform (e.g., using computing resource 235, processor 320, memory 330, storage component 340, input component 350, communication interface 370, and/or the like) may receive an authorization request associated with a transaction that is made by the user device as part of a checkout procedure of the website, as described above in connection with FIGS. 1A-1D. In some implementations, the authorization request may include the virtual transaction card identifier, and a second merchant identifier.

As further shown in FIG. 4, process 400 may include performing a first authorization procedure to determine whether the first merchant identifier matches or satisfies a threshold level of similarity with the second merchant identifier (block 470). For example, the transaction management platform (e.g., using computing resource 235, processor 320, memory 330, storage component 340, and/or the like) may perform a first authorization procedure to determine whether the first merchant identifier matches or satisfies a threshold level of similarity with the second merchant identifier, as described above in connection with FIGS. 1A-1D.

As further shown in FIG. 4, process 400 may include determining whether to forego a second authorization procedure based on a result of the first authorization procedure, wherein the device is to forego the second authorization procedure if the first authorization procedure succeeds or is to perform the second authorization procedure if the first authorization procedure fails (block 480). For example, the transaction management platform (e.g., using computing resource 235, processor 320, memory 330, storage component 340, and/or the like) may determine whether to forego a second authorization procedure based on a result of the first authorization procedure, as described above in connection with FIGS. 1A-1D. In some implementations, the device may forego the second authorization procedure if the first authorization procedure succeeds or is to perform the second authorization procedure if the first authorization procedure fails.

As further shown in FIG. 4, process 400 may include causing an authorization response to be provided to another device associated with the merchant, wherein the authorization response includes an indication of whether the transaction is approved (block 490). For example, the transaction management platform (e.g., using computing resource 235, processor 320, memory 330, storage component 340, output component 360, communication interface 370, and/or the like) may cause an authorization response to be provided to another device associated with the merchant, as described above in connection with FIGS. 1A-1D. In some implementations, the authorization response may include an indication of whether the transaction is approved.

Process 400 may include additional implementations, such as any single implementation or any combination of implementations described below and/or in connection with one or more other processes described elsewhere herein.

In some implementations, when determining the first merchant identifier, the transaction management platform may compare at least a portion of the URL associated with the webpage and a list of merchant identifiers for a group of merchants. In some implementations, when determining the first merchant identifier, the transaction management platform may determine that a particular merchant identifier, of the list of merchant identifiers, is the first merchant identifier, based on comparing at least the portion of the URL associated with the webpage and the list of merchant identifiers for the group of merchants.

In some implementations, when determining the first merchant identifier, the transaction management platform may determine that the first merchant identifier is not identifiable via the URL. In some implementations, when determining the first merchant identifier, the transaction management platform may identify one or more keywords included within the website using a data mining technique. In some implementations, when determining the first merchant identifier, the transaction management platform may determine the first merchant identifier using the one or more keywords.

In some implementations, when performing the first authorization procedure, the transaction management platform may determine whether the transaction is occurring within a threshold time period after generating the virtual transaction card. In some implementations, the transaction may have one or more transaction properties associated with a high-risk transaction. In some implementations, when determining whether to forego the second authorization procedure, the transaction management platform may determine to forego the second authorization procedure based on the first authorization procedure succeeding.

In some implementations, the virtual transaction card may be valid only for a threshold time period. In some implementations, when determining whether to forego the second authorization procedure, the transaction management platform may determine to forego a first group of authorization procedures, of the second authorization procedure, and to perform a second group of authorization procedures, of the second authorization procedure, based on a time period between when the virtual transaction card was generated and when the authorization request was received.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
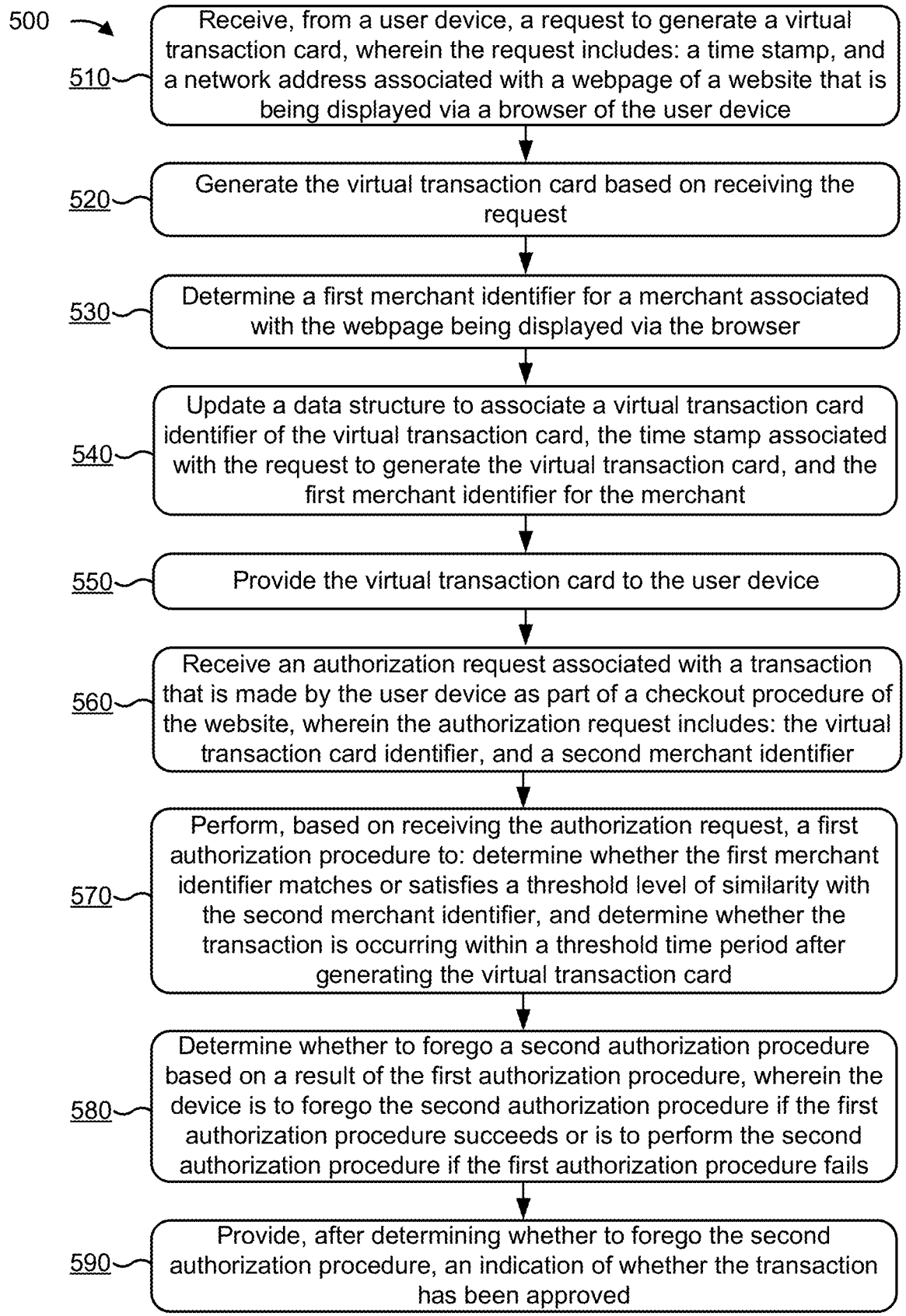

FIG. 5 is a flow chart of an example process 500 for authorizing a transaction by performing a first authorization procedure and by selectively performing a second authorization procedure based on whether the first authorization succeeds. In some implementations, one or more process blocks of FIG. 5 may be performed by a transaction management platform (e.g., transaction management platform 230). In some implementations, one or more process blocks of FIG. 5 may be performed by another device or a group of devices separate from or including the transaction management platform, such as a user device (e.g., user device 210), a merchant server device (e.g., merchant server device 220), an authorization server device (e.g., authorization server device 250), and/or the like.

As shown in FIG. 5, process 500 may include receiving, from a user device, a request to generate a virtual transaction card, wherein the request includes a time stamp, and a network address associated with a webpage of a website that is being displayed via a browser of the user device (block 510). For example, the transaction management platform (e.g., using computing resource 235, processor 320, memory 330, storage component 340, input component 350, communication interface 370, and/or the like) may receive, from a user device, a request to generate a virtual transaction card, as described above in connection with FIGS. 1A-1D. In some implementations, the request may include a time stamp, and a network address associated with a webpage of a website that is being displayed via a browser of the user device.

As further shown in FIG. 5, process 500 may include generating the virtual transaction card based on receiving the request (block 520). For example, the transaction management platform (e.g., using computing resource 235, processor 320, memory 330, storage component 340, and/or the like) may generate the virtual transaction card based on receiving the request, as described above in connection with FIGS. 1A-1D.

As further shown in FIG. 5, process 500 may include determining a first merchant identifier for a merchant associated with the webpage being displayed via the browser (block 530). For example, the transaction management platform (e.g., using computing resource 235, processor 320, memory 330, storage component 340, and/or the like) may determine a first merchant identifier for a merchant associated with the webpage being displayed via the browser, as described above in connection with FIGS. 1A-1D.

As further shown in FIG. 5, process 500 may include updating a data structure to associate a virtual transaction card identifier of the virtual transaction card, the time stamp associated with the request to generate the virtual transaction card, and the first merchant identifier for the merchant (block 540). For example, the transaction management platform (e.g., using computing resource 235, processor 320, memory 330, storage component 340, and/or the like) may update a data structure to associate a virtual transaction card identifier of the virtual transaction card, the time stamp associated with the request to generate the virtual transaction card, and the first merchant identifier for the merchant, as described above in connection with FIGS. 1A-1D.

As further shown in FIG. 5, process 500 may include providing the virtual transaction card to the user device (block 550). For example, the transaction management platform (e.g., using computing resource 235, processor 320, memory 330, storage component 340, output component 360, communication interface 370, and/or the like) may provide the virtual transaction card to the user device, as described above in connection with FIGS. 1A-1D.

As further shown in FIG. 5, process 500 may include receiving an authorization request associated with a transaction that is made by the user device as part of a checkout procedure of the website, wherein the authorization request includes the virtual transaction card identifier, and a second merchant identifier (block 560). For example, the transaction management platform (e.g., using computing resource 235, processor 320, memory 330, storage component 340, input component 350, communication interface 370, and/or the like) may receive an authorization request associated with a transaction that is made by the user device as part of a checkout procedure of the website, as described above in connection with FIGS. 1A-1D. In some implementations, the authorization request may include the virtual transaction card identifier, and a second merchant identifier.

As further shown in FIG. 5, process 500 may include performing, based on receiving the authorization request, a first authorization procedure to determine whether the first merchant identifier matches or satisfies a threshold level of similarity with the second merchant identifier, and to determine whether the transaction is occurring within a threshold time period after generating the virtual transaction card (block 570). For example, the transaction management platform (e.g., using computing resource 235, processor 320, memory 330, storage component 340, and/or the like) may perform, based on receiving the authorization request, a first authorization procedure to determine whether the first merchant identifier matches or satisfies a threshold level of similarity with the second merchant identifier, and to determine whether the transaction is occurring within a threshold time period after generating the virtual transaction card, as described above in connection with FIGS. 1A-1D.

As further shown in FIG. 5, process 500 may include determining whether to forego a second authorization procedure based on a result of the first authorization procedure, wherein the device is to forego the second authorization procedure if the first authorization procedure succeeds or is to perform the second authorization procedure if the first authorization procedure fails (block 580). For example, the transaction management platform (e.g., using computing resource 235, processor 320, memory 330, storage component 340, and/or the like) may determine whether to forego a second authorization procedure based on a result of the first authorization procedure, as described above in connection with FIGS. 1A-1D. In some implementations, the device may forego the second authorization procedure if the first authorization procedure succeeds or is to perform the second authorization procedure if the first authorization procedure fails.

As further shown in FIG. 5, process 500 may include providing, after determining whether to forego the second authorization procedure, an indication of whether the transaction has been approved (block 590). For example, the transaction management platform (e.g., using computing resource 235, processor 320, memory 330, storage component 340, output component 360, communication interface 370, and/or the like) may provide, after determining whether to forego the second authorization procedure, an indication of whether the transaction has been approved, as described above in connection with FIGS. 1A-1D.

Process 500 may include additional implementations, such as any single implementation or any combination of implementations described below and/or in connection with one or more other processes described elsewhere herein.

In some implementations, when receiving the request to generate the virtual transaction card, the transaction management platform may receive the request from an extension of the browser used by the user device.

In some implementations, when determining the first merchant identifier, the transaction management platform may compare the network address and a list of merchant identifiers for a group of merchants. In some implementations, when determining the first merchant identifier, the transaction management platform may determine that a particular merchant identifier, of the list of merchant identifiers, is the first merchant identifier, based on comparing the network address and the list of merchant identifiers for the group of merchants.

In some implementations, when determining the first merchant identifier, the transaction management platform may determine that the first merchant identifier is not identifiable via the network address. In some implementations, when determining the first merchant identifier, the transaction management platform may identify one or more keywords included within the website using a data mining technique based on determining that the first merchant identifier is not identifiable via the network address. In some implementations, when determining the first merchant identifier, the transaction management platform may determine the first merchant identifier using the one or more keywords.

In some implementations, the transaction may have one or more transaction properties associated with a high-risk transaction, and the transaction management platform, when determining whether to forego the second authorization procedure, may determine to forego the second authorization procedure based on the first authorization procedure succeeding.

In some implementations, the threshold time period after generating the virtual transaction card may be a first threshold time period, and the virtual transaction card may be valid only for a second threshold time period.

In some implementations, when determining whether to forego the second authorization procedure, the transaction management platform may determine to forego a first group of authorization procedures, of the second authorization procedure, and to perform a second group of authorization procedures, of the second authorization procedure, based on whether the transaction occurred within the threshold time period after generating the virtual transaction card.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
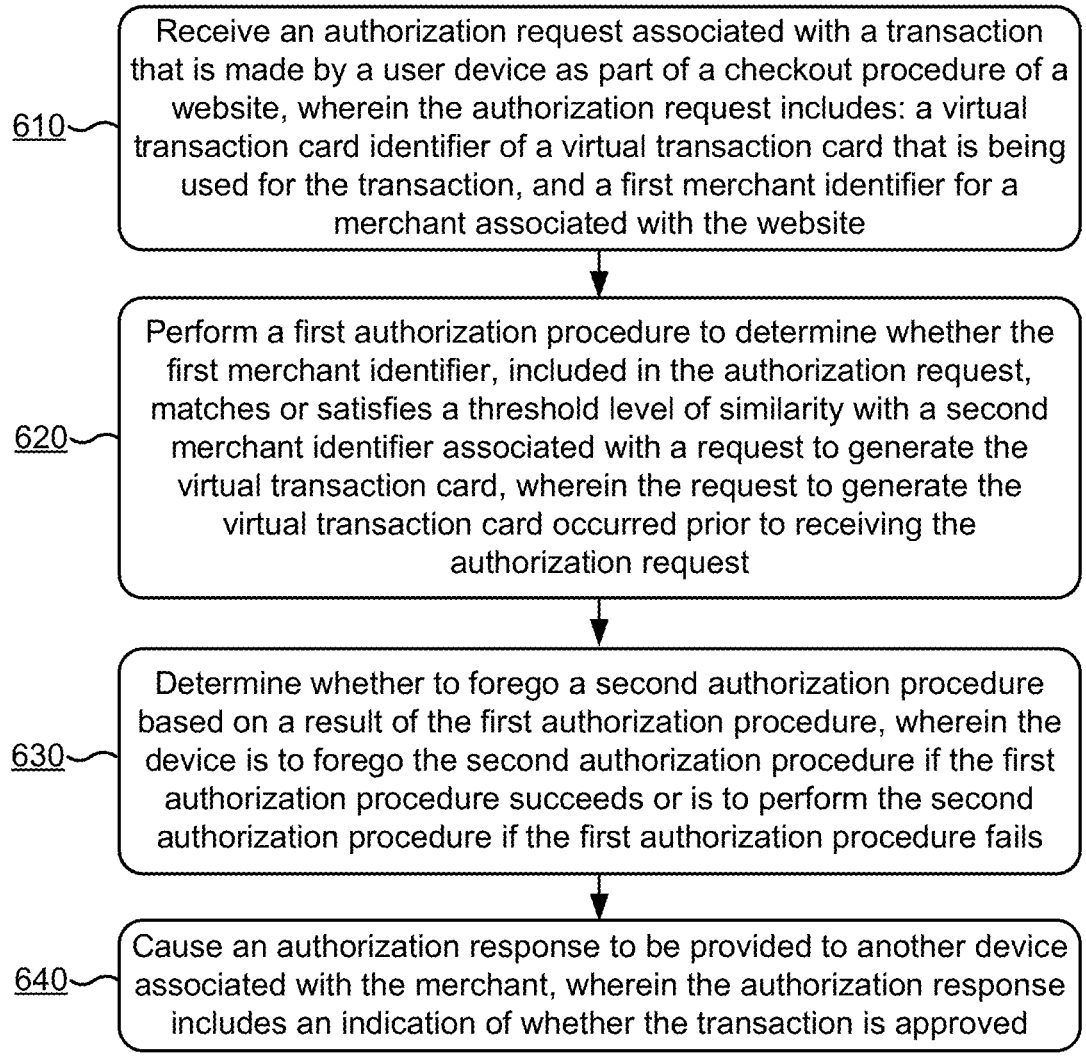

FIG. 6 is a flow chart of an example process 600 for authorizing a transaction by performing a first authorization procedure and by selectively performing a second authorization procedure based on whether the first authorization succeeds. In some implementations, one or more process blocks of FIG. 6 may be performed by a transaction management platform (e.g., transaction management platform 230). In some implementations, one or more process blocks of FIG. 6 may be performed by another device or a group of devices separate from or including the transaction management platform, such as a user device (e.g., user device 210), a merchant server device (e.g., merchant server device 220), an authorization server device (e.g., authorization server device 250), and/or the like.

As shown in FIG. 6, process 600 may include receiving an authorization request associated with a transaction that is made by a user device as part of a checkout procedure of a website, wherein the authorization request includes a virtual transaction card identifier of a virtual transaction card that is being used for the transaction, and a first merchant identifier for a merchant associated with the website (block 610). For example, the transaction management platform (e.g., using computing resource 235, processor 320, memory 330, storage component 340, input component 350, communication interface 370, and/or the like) may receive an authorization request associated with a transaction that is made by a user device as part of a checkout procedure of a website, as described above in connection with FIGS. 1A-1D. In some implementations, the authorization request may include a virtual transaction card identifier of a virtual transaction card that is being used for the transaction, and a first merchant identifier for a merchant associated with the website.

As further shown in FIG. 6, process 600 may include performing a first authorization procedure to determine whether the first merchant identifier, included in the authorization request, matches or satisfies a threshold level of similarity with a second merchant identifier associated with a request to generate the virtual transaction card, wherein the request to generate the virtual transaction card occurred prior to receiving the authorization request (block 620). For example, the transaction management platform (e.g., using computing resource 235, processor 320, memory 330, storage component 340, and/or the like) may perform a first authorization procedure to determine whether the first merchant identifier, included in the authorization request, matches or satisfies a threshold level of similarity with a second merchant identifier associated with a request to generate the virtual transaction card, as described above in connection with FIGS. 1A-1D. In some implementations, the request to generate the virtual transaction card may have occurred prior to receiving the authorization request.

As further shown in FIG. 6, process 600 may include determining whether to forego a second authorization procedure based on a result of the first authorization procedure, wherein the device is to forego the second authorization procedure if the first authorization procedure succeeds or is to perform the second authorization procedure if the first authorization procedure fails (block 630). For example, the transaction management platform (e.g., using computing resource 235, processor 320, memory 330, storage component 340, and/or the like) may determine whether to forego a second authorization procedure based on a result of the first authorization procedure, as described above in connection with FIGS. 1A-1D. In some implementations, the device may forego the second authorization procedure if the first authorization procedure succeeds or is to perform the second authorization procedure if the first authorization procedure fails.

As further shown in FIG. 6, process 600 may include causing an authorization response to be provided to another device associated with the merchant, wherein the authorization response includes an indication of whether the transaction is approved (block 640). For example, the transaction management platform (e.g., using computing resource 235, processor 320, memory 330, storage component 340, output component 360, communication interface 370, and/or the like) may cause an authorization response to be provided to another device associated with the merchant, as described above in connection with FIGS. 1A-1D. In some implementations, the authorization response may include an indication of whether the transaction is approved.

Process 600 may include additional implementations, such as any single implementation or any combination of implementations described below and/or in connection with one or more other processes described elsewhere herein.

In some implementations, the transaction management platform may receive, before receiving the authorization request and from an extension of a browser used by the user device to access the website, the request to generate the virtual transaction card. The request may include a time stamp, and a network address associated with a webpage of the website that is being displayed via the browser. In some implementations, the transaction management platform may generate the virtual transaction card based on receiving the request, may determine the second merchant identifier by processing the request to generate the virtual transaction card, may update a data structure to associate the virtual transaction card identifier of the virtual transaction card, the time stamp associated with the request to generate the virtual transaction card, and the second merchant identifier. In some implementations, the transaction management platform may provide, before receiving the authorization request, the virtual transaction card to the user device.

In some implementations, when determining the second merchant identifier, the transaction management platform may determine that the merchant identifier is not identifiable via the network address, may identify one or more keywords included within the website using a data mining technique, and may determine the second merchant identifier using the one or more keywords.

In some implementations, when performing the first authorization procedure, the transaction management platform may determine whether the transaction is occurring within a threshold time period after generation of the virtual transaction card.

In some implementations, the transaction may have one or more transaction properties associated with a high-risk transaction, and the transaction management platform, when determining whether to forego the second authorization procedure, may determine to forego the second authorization procedure based on the first authorization procedure succeeding. In some implementations, the virtual transaction card may be valid only for the transaction.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
  receiving, by a device, an authorization request associated with a transaction, wherein the authorization request includes:
    a first identifier associated with a virtual transaction card associated with the transaction, and
    a second identifier associated with a merchant associated with the transaction;
  performing, by the device, a first authorization procedure to determine whether the second identifier satisfies a threshold level of similarity with a third identifier associated with the merchant,
    wherein the third identifier is associated with a request to generate the virtual transaction card; and
  selectively causing, by the device and based on determining whether to forego a second authorization procedure based on a result of the first authorization procedure, an authorization response to be provided to another device associated with the merchant,
    wherein the authorization response includes an indication of whether the transaction is approved.

2. The method of claim 1, wherein the authorization request is part of a checkout procedure of a website.

3. The method of claim 1, wherein the request to generate the virtual transaction card is received via an extension of a browser accessing a website.

4. The method of claim 1, wherein the request to generate the virtual transaction card is received via an extension of a browser accessing a website, and
  wherein the request includes a network address associated with a webpage that is being displayed via the browser.

5. The method of claim 1, wherein performing the first authorization procedure comprises:
  determining whether the transaction is occurring within a threshold time period after generating the virtual transaction card.

6. The method of claim 1, wherein the authorization request includes at least one of:
  information associated with the virtual transaction card,
  the third identifier, or
  a time stamp indicating a time the authorization request is generated.

7. The method of claim 1, further comprising:
  updating a data structure to associate the first identifier, a time stamp associated with the request to generate the virtual transaction card, and the second identifier, with each other; and
  performing the first authorization procedure based on information associated with the data structure.

8. A device, comprising:
  one or more memories; and
  one or more processors, coupled to the one or more memories, configured to:
    receive an authorization request associated with a transaction, wherein the authorization request includes:
      a first identifier associated with a virtual transaction card associated with the transaction, and
      a second identifier associated with a merchant associated with the transaction;
    perform a first authorization procedure to determine whether the second identifier satisfies a threshold level of similarity with a third identifier associated with the merchant, wherein the third identifier is associated with a request to generate the virtual transaction card; and selectively cause, based on determining whether to forego a second authorization procedure based on a result of the first authorization procedure, a transaction approval to be provided to another device associated with the merchant.

9. The device of claim 8, wherein the authorization request is part of a checkout procedure of a website.

10. The device of claim 8, wherein the request to generate the virtual transaction card is received via an extension of a browser accessing a website.

11. The device of claim 8, wherein the request to generate the virtual transaction card is received via an extension of a browser accessing a website, and
wherein the request includes a network address associated with a webpage that is being displayed via the browser.

12. The device of claim 8, wherein the one or more processors, to perform the first authorization procedure, are configured to:
determine whether the transaction is occurring within a threshold time period after generating the virtual transaction card.

13. The device of claim 8, wherein the authorization request includes at least one of:
information associated with the virtual transaction card, the third identifier, or
a time stamp indicating a time the authorization request is generated.

14. The device of claim 8, wherein the one or more processors are further configured to:
update a data structure to associate the first identifier, a time stamp associated with the request to generate the virtual transaction card, and the second identifier, with each other; and
perform the first authorization procedure based on information associated with the data structure.

15. A non-transitory computer-readable medium storing a set of instructions, the set of instructions comprising:
one or more instructions that, when executed by one or more processors of a device, cause the device to:
receive a first request associated with a transaction, wherein the first request includes:
a first identifier associated with a virtual transaction card associated with the transaction, and
a second identifier associated with a merchant associated with the transaction;
perform a first authorization procedure to determine whether the second identifier satisfies a threshold level of similarity with a third identifier associated with the merchant,
wherein the third identifier is associated with a second request to generate the virtual transaction card; and
selectively cause, based on determining whether to forego a second authorization procedure based on a result of the first authorization procedure, a transaction approval to be provided to another device associated with the merchant.

16. The non-transitory computer-readable medium of claim 15, wherein the first request is part of a checkout procedure of a website.

17. The non-transitory computer-readable medium of claim 15, wherein the second request to generate the virtual transaction card is received via an extension of a browser accessing a website.

18. The non-transitory computer-readable medium of claim 15, wherein the second request to generate the virtual transaction card is received via an extension of a browser accessing a website, and
wherein the second request includes a network address associated with a webpage that is being displayed via the browser.

19. The non-transitory computer-readable medium of claim 15, wherein the one or more instructions, that cause the device to perform the first authorization procedure, cause the device to:
determine whether the transaction is occurring within a threshold time period after generating the virtual transaction card.

20. The non-transitory computer-readable medium of claim 15, wherein the first request includes at least one of:
information associated with the virtual transaction card, the third identifier, or
a time stamp indicating a time the first request is generated.

* * * * *